United States Patent
Lee et al.

(10) Patent No.: US 7,462,872 B2
(45) Date of Patent: Dec. 9, 2008

(54) IN-PLANE SWITCHING MODE LIQUID CRYSTAL DISPLAY DEVICE

(75) Inventors: Yun Bok Lee, Seoul (KR); In Duk Song, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 158 days.

(21) Appl. No.: 09/893,964

(22) Filed: Jun. 29, 2001

(65) Prior Publication Data

US 2002/0024626 A1 Feb. 28, 2002

(30) Foreign Application Priority Data

Aug. 11, 2000 (KR) .............................. 2000-46621

(51) Int. Cl.
*H01L 27/15* (2006.01)
*G01F 1/1333* (2006.01)

(52) U.S. Cl. .................... 257/83; 349/141; 349/143

(58) Field of Classification Search ................ 349/141, 349/143; 257/83
See application file for complete search history.

(56) References Cited

U.S. PATENT DOCUMENTS

| 43,327 | A | * | 6/1864 | Moorehead | 57/316 |
|---|---|---|---|---|---|
| 5,598,285 | A | | 1/1997 | Kondo et al. | 349/39 |
| 5,745,207 | A | | 4/1998 | Asada et al. | 349/141 |
| 5,905,556 | A | | 5/1999 | Suzuki et al. | 349/141 |
| 5,946,066 | A | | 8/1999 | Lee et al. | 349/141 |
| 6,266,116 | B1 | * | 7/2001 | Ohta et al. | 349/141 |
| 6,288,763 | B1 | * | 9/2001 | Hirota | 349/141 |
| 6,452,657 | B1 | * | 9/2002 | Suzuki et al. | 349/141 |
| 6,459,465 | B1 | * | 10/2002 | Lee | 349/141 |
| 6,490,020 | B2 | * | 12/2002 | Kung | 349/117 |
| 6,507,383 | B1 | * | 1/2003 | Abe et al. | 349/141 |
| 6,538,713 | B1 | * | 3/2003 | Yanagawa et al. | 349/146 |

FOREIGN PATENT DOCUMENTS

| JP | 9-105908 | 4/1997 |
|---|---|---|
| JP | 9-258269 | 10/1997 |
| JP | 2000-171816 | 6/2000 |
| JP | 2000-305095 | 11/2000 |
| JP | 2000-305096 | 11/2000 |

(Continued)

OTHER PUBLICATIONS

R. Kieler et al.; "In-Plane Switching of Nematic Liquid Crystals"; Japan Display '92; pp. 547-550.

(Continued)

*Primary Examiner*—Wael Fahmy
*Assistant Examiner*—Steven H Rao
(74) *Attorney, Agent, or Firm*—McKenna Long & Aldridge LLP

(57) ABSTRACT

An in-plane switching mode LCD device improves an aperture ratio and a process margin and minimizes disclination. The in-plane switching mode LCD device includes: gate lines formed on a substrate; data lines having a plurality of bent portions to cross the gate lines, the data and gate lines forming a pixel region; a plurality of data electrodes and common electrodes having a plurality of bent portions; and common lines on the bent portions of the data lines, the data electrodes and the common electrodes.

30 Claims, 9 Drawing Sheets

FOREIGN PATENT DOCUMENTS

JP        2000-305097        11/2000

OTHER PUBLICATIONS

M. Oh-e, et al.; "Principles and Characteristics of Electro-Optical Behaviour with In-Plane Switching Mode"; Asia Display '95; pp. 577-580.

M. Ohta et al.; "Development of Super-TFT-LCDs with In-Plane Switching Display Mode"; Asia Display '95; pp. 707-710.

S. Matsumoto et al.; Display Characteristics of In-Plane Switching (IPS) LCDs and a Wide-Viewing-Angle 14.5-in. OPS TFT-LCD; Euro Display '96; pp. 445-448.

H. Wakemoto et al.; "An Advanced In-Plane Switching Mode TFT-LCD"; SID 97 Digest; pp. 929-932.

S.H. Lee et al.; High-Transmittance, Wide-Viewing-Angle Nematic Liquid Crystal Display Controlled by Fringe-Field Switching; Asia Display '98; pp. 371-374.

* cited by examiner

IN-PLANE SWITCHING MODE LIQUID CRYSTAL DISPLAY DEVICE

This application claims the benefit of Korean Patent Application No. 2000-46621, filed on Aug. 11, 2000, which is hereby incorporated by reference for all purposes as if fully set forth herein.

BACKGROUND OF THE INVENTION

1. Field of the Invention

The present invention relates to a liquid crystal display device, and more particularly, to an in-plane switching mode liquid crystal display device which improves aperture ratio together with viewing angle and color characteristics.

2. Discussion of the Related Art

Recently, a thin film transistor-liquid crystal display (TFT-LCD), mainly used for notebook computers or, requires a large sized screen. However, the TFT-LCD has a problem in that contrast ratio is varied depending on viewing angles. To solve such a problem, various LCDs, such as a twisted nematic LCD, provided with a film-compensating mode, and a multi-domain LCD have been proposed. Such proposed LCDs substantially fail to solve problems related to contrast ratio and color.

Under the circumstances, an in-plane switching mode LCD device has been proposed to obtain a wider viewing angle.

A related art in-plane switching mode LCD device will be described with reference to the accompanying drawings.

FIG. 1 is a plan view showing a unit pixel of a related art in-plane switching mode LCD device. As shown in FIG. 1, gate lines 11 and 11a and data lines 12 and 12a are formed on a substrate to divide a pixel region. Also, the gate lines 11 and 11a are formed to cross the data lines 12 and 12a. A plurality of common electrodes 14 are formed of the same material as that of the gate lines within the pixel region in a zig-zag pattern. A common line 15 is formed in parallel with the gate lines 11 and 11a and is connected with the common electrodes 14. A data electrode 13 of a zig-zag pattern is formed substantially in parallel with the common electrodes on the same plane as the data lines 12 and 12a. A thin film transistor (TFT) 19 is formed in a region where the gate lines cross the data lines.

The common line 15, the gate lines 11 and 11a, and the common electrodes 14 are formed by the same process and are flush with one another. They are formed by a photo-etching process after depositing a metal such as Al, Mo, Ta, Al alloy by sputtering.

The TFT 19 includes a gate electrode 16 formed on the substrate and extended from the gate lines 11, a source electrode 17 extended from the data lines 12, and a drain electrode 18 connected with the data electrode 13.

The aforementioned related art in-plane switching mode LCD device utilizes a storage capacitor to better sustain a voltage applied to a liquid crystal, improve display of stable gray level, and to reduce flicker and residual images.

A storage on gate (SOG) mode and a storage on common (SOC) mode also utilize the storage capacitor.

In the SOG mode, some of (n−1)th gate line among a plurality of gate lines are used as a storage capacitor of an n-th pixel. In the SOC mode, an electrode for a storage capacitor is separately formed to be connected with a common electrode.

For reference, the related art in-plane switching mode LCD device adopts the SOC mode.

In other words, the common line 15 connected with the common electrodes 14 is used as a separate storage capacitor, and the common line 15 overlaps the data electrode 13 in a different layer to form a storage capacitor.

However, the related art in-plane switching mode LCD device has several problems.

First, since the common line and the data electrode have a zig-zag pattern, strong electric field distortion occurs in a bent portion of the zig-zag pattern. For this reason, liquid crystal molecules are irregularly arranged, thereby causing disclination.

Second, although the common line is formed of the same metal as the gate lines, an aperture ratio corresponding to an area occupied by the common line within the pixel region is reduced due to the SOC mode.

Finally, since the gate lines are formed with the common line, the process should be performed so as not to generate electrical short between the gate lines and the common line if the gate lines are formed to be adjacent to the common line. In this case, it is difficult to obtain a process margin.

SUMMARY OF THE INVENTION

Accordingly, the present invention is directed to an in-plane switching mode LCD device that substantially obviates one or more of the problems due to limitations and disadvantages of the related art.

An object of the present invention is to provide an in-plane switching mode LCD device which improves an aperture ratio and a process margin and minimizes disclination.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, an in-plane switching mode LCD device comprising: gate lines formed on a substrate; data lines having a plurality of bent portions to cross the gate lines, the data and gate lines defining a pixel region; a plurality of data electrodes and common electrodes having a plurality of bent portions; and common lines on the bent portions of the data lines, the data electrodes and the common electrodes.

In another aspect, an in-plane switching mode LCD device according to the present invention includes: gate lines formed on a substrate; data lines formed in a zig-zag pattern having a plurality of bent portions to cross the gate lines; a plurality of data electrodes formed within a pixel region defined by the data and gate lines in a zig-zag pattern having a plurality of bent portions, adjacent data electrodes being connected with each other in a bent portion; common electrodes formed at one side of the respective data electrode in a zig-zag pattern having a plurality of bent portions; and common lines formed in parallel with the gate lines to pass through the respective bent portions of the data lines, the data electrodes and the common electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings, like reference numerals refer to like elements.

In the Drawings

DETAILED DESCRIPTION OF THE PREFERRED EMBODIMENTS

Reference will now be made in detail to the preferred embodiments of the present invention, examples of which are illustrated in the accompanying drawings.

First Embodiment

An in-plane switching mode LCD device according to the first embodiment of the present invention will be described with reference to the accompanying drawings.

Figure 1:
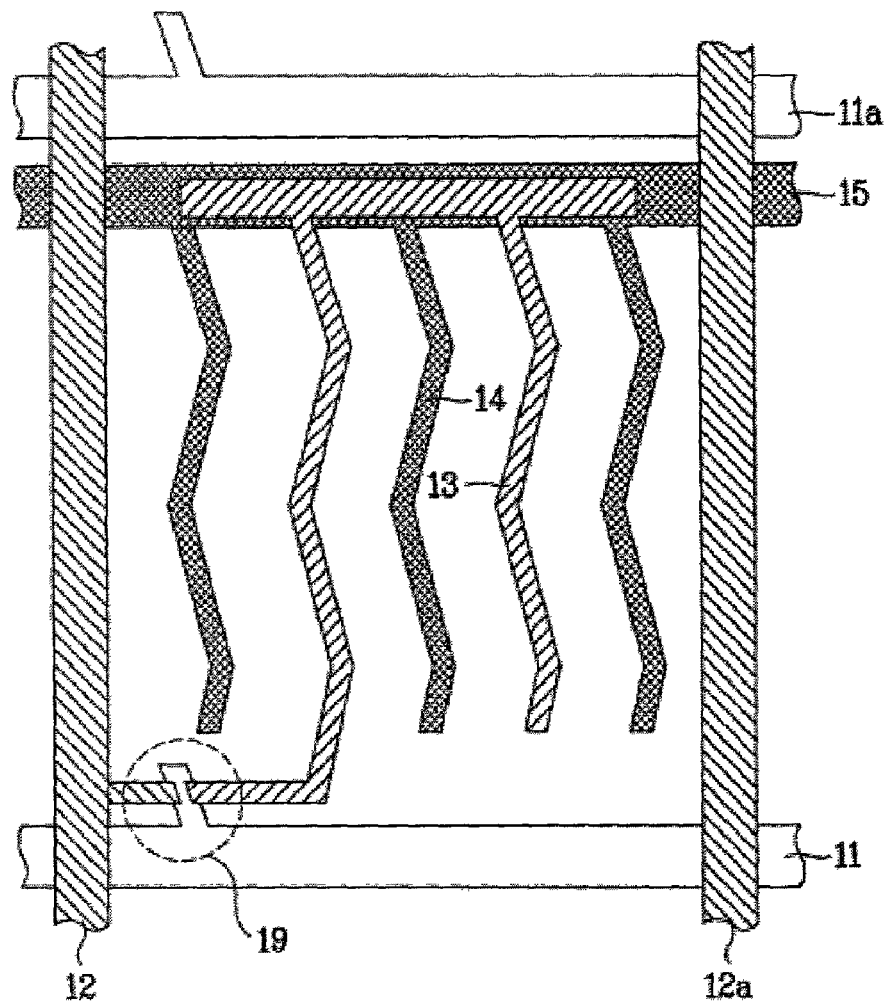
FIG. 1 is a plan view of a unit pixel showing a related art in-plane switching mode LCD device.
Figure 2:
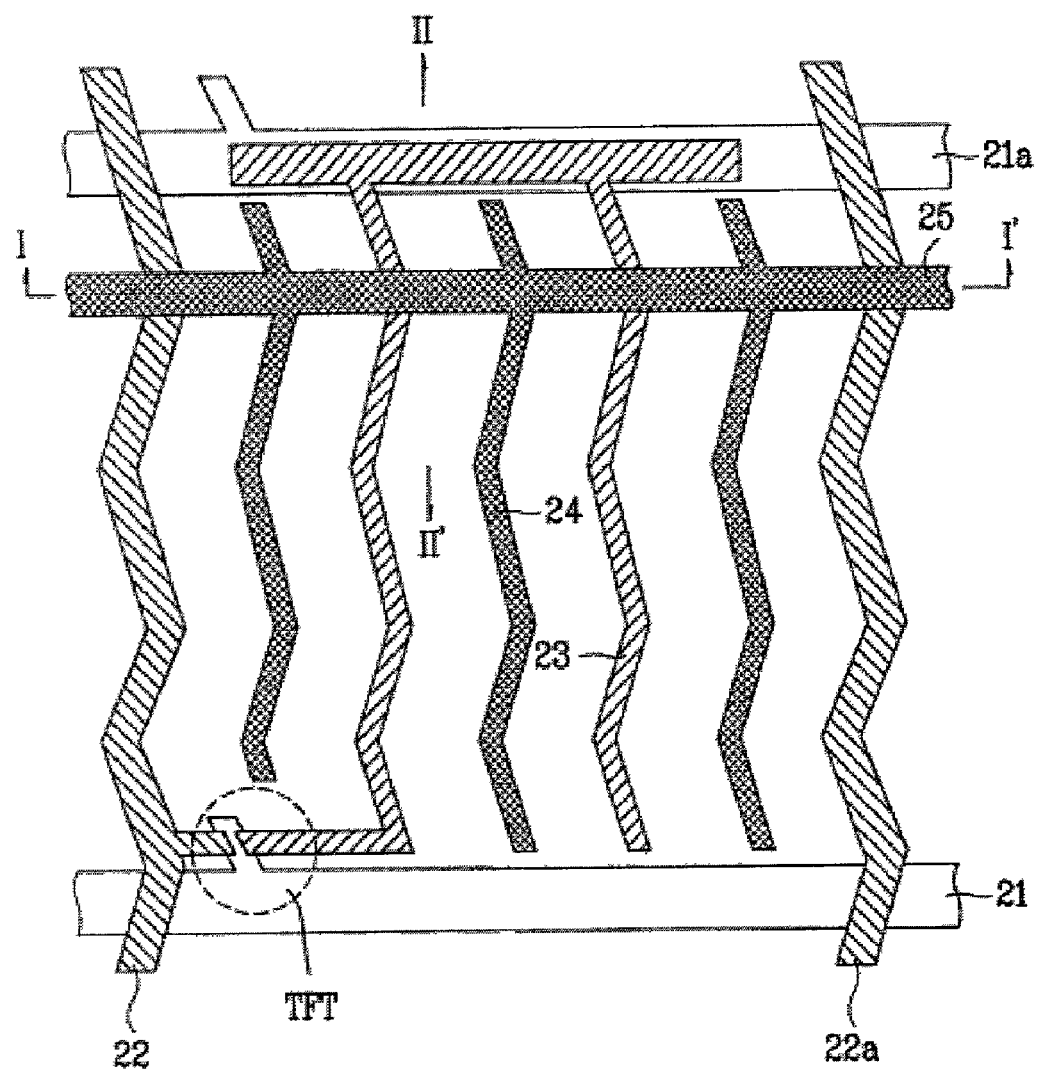
FIG. 2 is a plan view of a unit pixel showing an in-plane switching mode LCD device according to the first embodiment of the present invention.
Figure 3A:
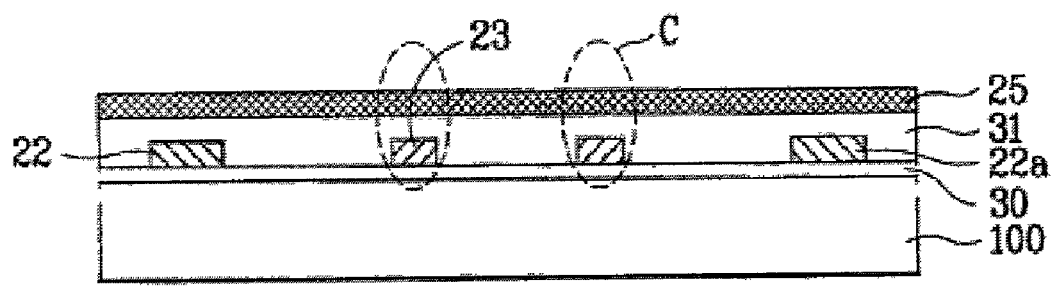
FIG. 3A is a sectional view taken along line I-I' of FIG. 2.
Figure 3B:
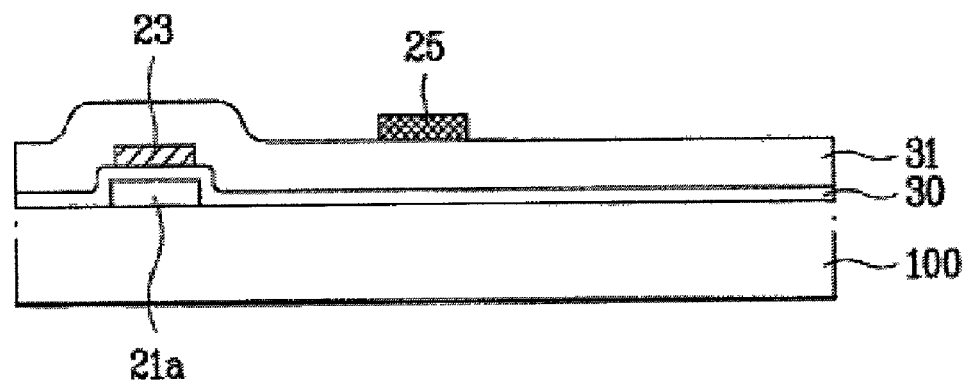
FIG. 3B is a sectional view taken along line II-II' of FIG. 2.

As shown in FIGS. 2 and 3A to 3B, the in-plane switching mode LCD device according to the first embodiment of the present invention includes gate lines 21 and 21a formed on a substrate in one direction, data lines 22 and 22a formed in a zig-zag pattern having a plurality of bent portions to cross the gate lines 21 and 21a to define a pixel region, a plurality of data electrodes 23 formed within the pixel region in a zig-zag pattern substantially in parallel with the data lines 22 and 22a, a plurality of common electrodes 24 formed at one side of the respective data electrodes 23 in a zig-zag pattern, and a common line 25 formed in parallel with the gate lines 21 and 21a to pass through respective bent portions of the data lines 21 and 21a, the data electrodes 23 and the common electrodes 24.

The common line 25 is formed integrally with the common electrodes 24 in a straight stripe type having no bent portion. The data electrodes 23 partially overlap adjacent gate lines 21a.

Meanwhile, in the figures, while one common line 25 has been formed within a unit pixel, stripe type common lines may be formed in each bent portion of the data lines, the common electrodes, and the data electrodes. There may be, for example, more than one respective set of bent portions in the data lines, the common electrodes, and the data electrodes.

The gate lines 21 and 21a are formed of a metal such as Al, Ta, Mo, Al alloy, while the common line 25 and the common electrodes 24 are formed of a conductive material such as indium tin oxide (ITO) and indium zinc oxide (IZO). The data electrodes 23 are formed of the same material as that of the common line 25 and the common electrodes 24.

Referring to FIGS. 3A and 3B, a gate insulating film 30 is formed between the gate lines 21 and 21a and the data electrodes 23 and between the data lines 22 and 22a and the data electrodes 23. A passivation film 31 is formed between the data lines 22 and 22a and the data electrodes 23 and between the common line 25 and the common electrodes 24. At this time, the gate insulating film 30 is formed of an inorganic material such as $SiN_X$ or $SiO_X$ having good adhesion with the gate lines 21 and 21a and good insulating internal pressure characteristics. The passivation film 31 is formed of an organic material such as Benzocyclobutene (BCB) or an an inorganic material such as $SiN_X$ or $SiO_X$.

Figure 4A:
FIGS. 4A to 4C are sectional views of fabricating process steps of an in-plane switching mode LCD device according to the first embodiment of the present invention.
Figure 4B:
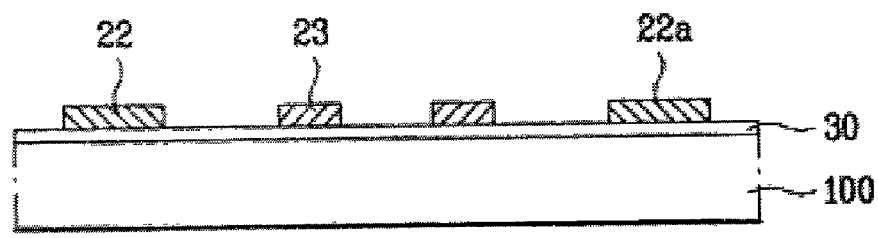
Figure 4C:
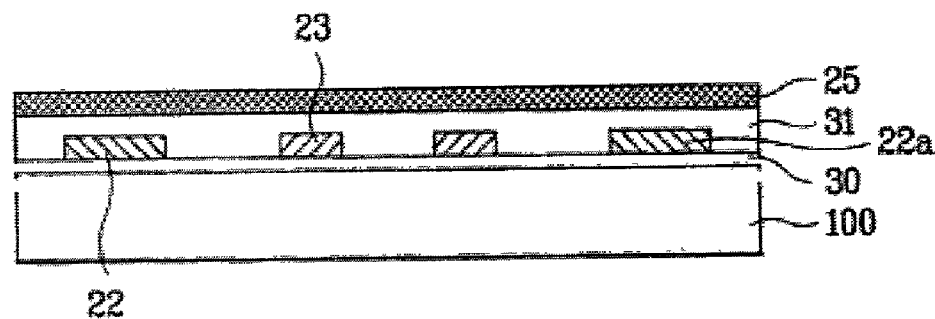

A method for manufacturing the aforementioned in plane switching mode LCD device according to the first embodiment of the present invention will be described with reference to FIGS. 4A to 4C. FIGS. 4A to 4C are sectional views taken along line II-II' of FIG. 2.

As shown in FIG. 4A, the gate insulating film 30 of $SiN_X$ or $SiO_X$ is formed on the substrate 100. Although not shown, a gate line and a gate electrode of the TFT are further formed before the gate insulating film 30 is formed. The gate line and the gate electrode are formed by sputtering and patterning any one of Al, Cr, Mo, Cu, and Al alloy.

Afterwards, as shown in FIG. 4B, a transparent conductive material such as ITO or IZO is formed on the gate insulating film 30 and then patterned to form the data lines 22 and 22a and the plurality of data electrodes 23. The data lines 22 and 22a define the pixel region together with the gate lines 21 and 21a, and the data electrodes 23 are formed within the pixel region in parallel with the data lines.

Subsequently, as shown in FIG. 4C, the passivation film 31 is formed on the entire surface including the data lines 22 and 22a and the data electrodes 23. A transparent conductive material such as ITO or IZO is then formed on the passivation film 31 and patterned to form the common line 25 in a direction crossing the data lines 22 and 22a. At this time, a common electrode (not shown) is formed to be connected with the common line 25 to apply in-plane electric field to the liquid crystal layer together with the data electrodes 23.

In the aforementioned in-plane switching mode LCD device according to the first embodiment of the present invention, the common line 25 of a transparent conductive material has been formed to avoid disclination that occurs in a bent portion of a zig-zag pattern. As shown in a dotted line of FIG. 3A, a storage capacitor C is formed between an overlap portion between the common line 25 and the data electrodes 23.

Meanwhile, in the first embodiment of the present invention, since the common line 25 is formed of a transparent conductive material, aperture ratio is not reduced even if the common line 25 is formed in the pixel region. Furthermore, since the gate lines are not formed with the common line, it is possible to obtain a process margin as compared with a case where the gate lines are formed with the common line.

Second Embodiment

In the second embodiment of the present invention, bent portions of data lines, common electrodes and data electrodes are minimized within a unit pixel as compared with the first embodiment.

Figure 5:
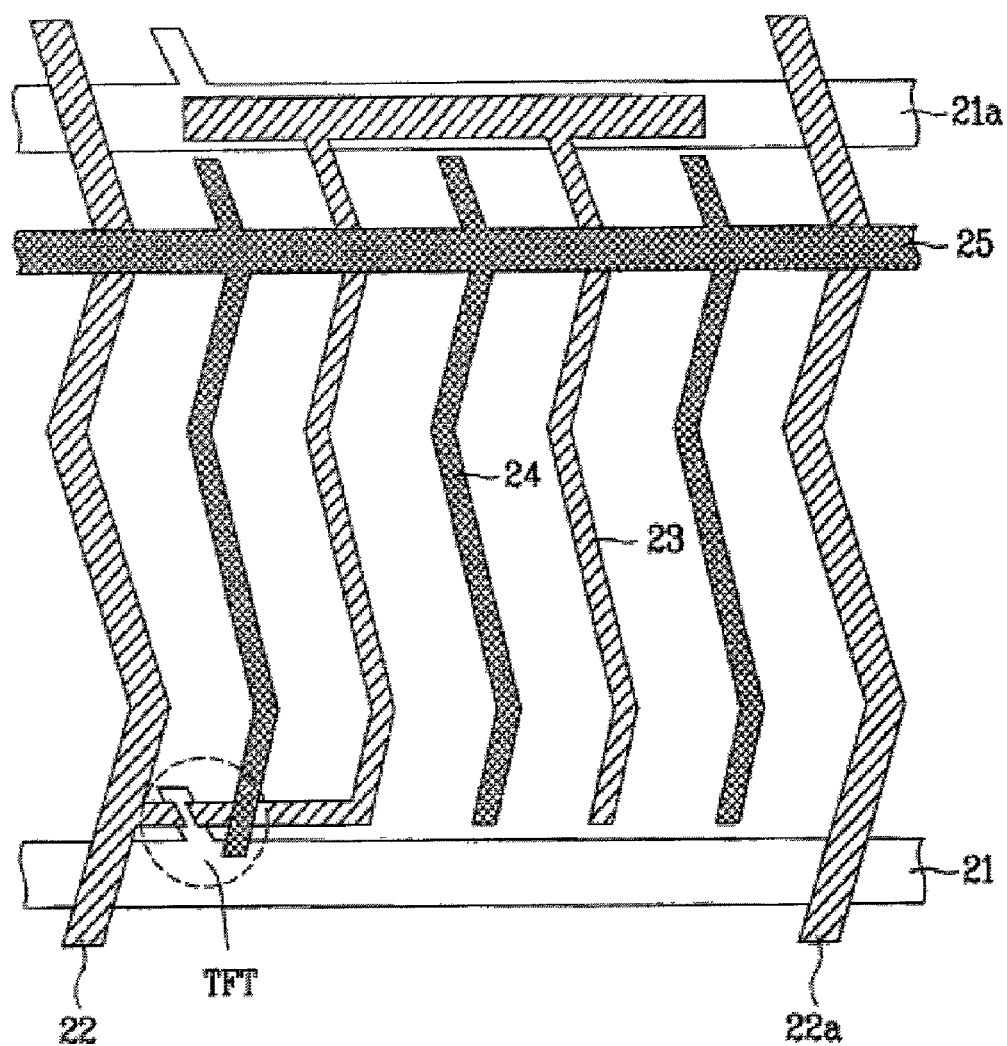
FIG. 5 is a plan view of a unit pixel showing an in-plane switching mode LCD device according to the second embodiment of the present invention.

FIG. 5 is a plan view of a unit pixel showing an in-plane switching mode LCD device according to the second embodiment of the present invention. As seen from FIG. 5, the second embodiment is equal to the first embodiment except that the bent portions are minimized. Accordingly, a detailed description of the second embodiment will be omitted.

The first embodiment of the present invention is more suitable for a mode having a large sized unit pixel, while the second embodiment is more suitable for a mode having a small sized unit pixel. That is, supposing that the most normal pixel has a quadrangle shape, a pixel type varied from the quadrangle shape is obtained if a bent portion of a zig-zag pattern is minimized in the mode having a large sized unit pixel. However, a pixel type little varied from the quadrangle shape can be obtained when a lot of the bent portions of the zig-zag pattern exist in the same manner as the first embodiment.

On the other hand, if a lot of the bent portions of the zig-zag pattern exist in the unit pixel having a small size, it is difficult to obtain a process margin. Accordingly, as shown in FIG. 5, since a pixel size is too small to recognize a type of the pixel even if the bent portion of the zig-zag pattern is minimized, it is possible to minimize disclination in the bent portion by application of the second embodiment to the mode having a small pixel size. Thus, an aperture ratio can be improved and a process margin can be obtained.

For reference, since a method for manufacturing the in-plane switching mode LCD device according to the second embodiment of the present invention is the same as the method according to the first embodiment of the present invention, its description will be omitted.

Third Embodiment

In the third embodiment of the present invention, it is intended to increase a storage capacitor.

In other words, in the first and second embodiments of the present invention, an overlap area, in which a storage capacitor is formed between the data electrodes and the common line is limited. However, in the third embodiment, the data electrodes are formed to extend to the common line, so that the overlap area between the data electrodes and the common line are increased to maximize the storage capacitor.

An in-plane switching mode LCD device according to the third embodiment of the present invention will be described with reference to FIGS. 6A, 6B, 7, 8A, 8B, and 8C.

Figure 6A:
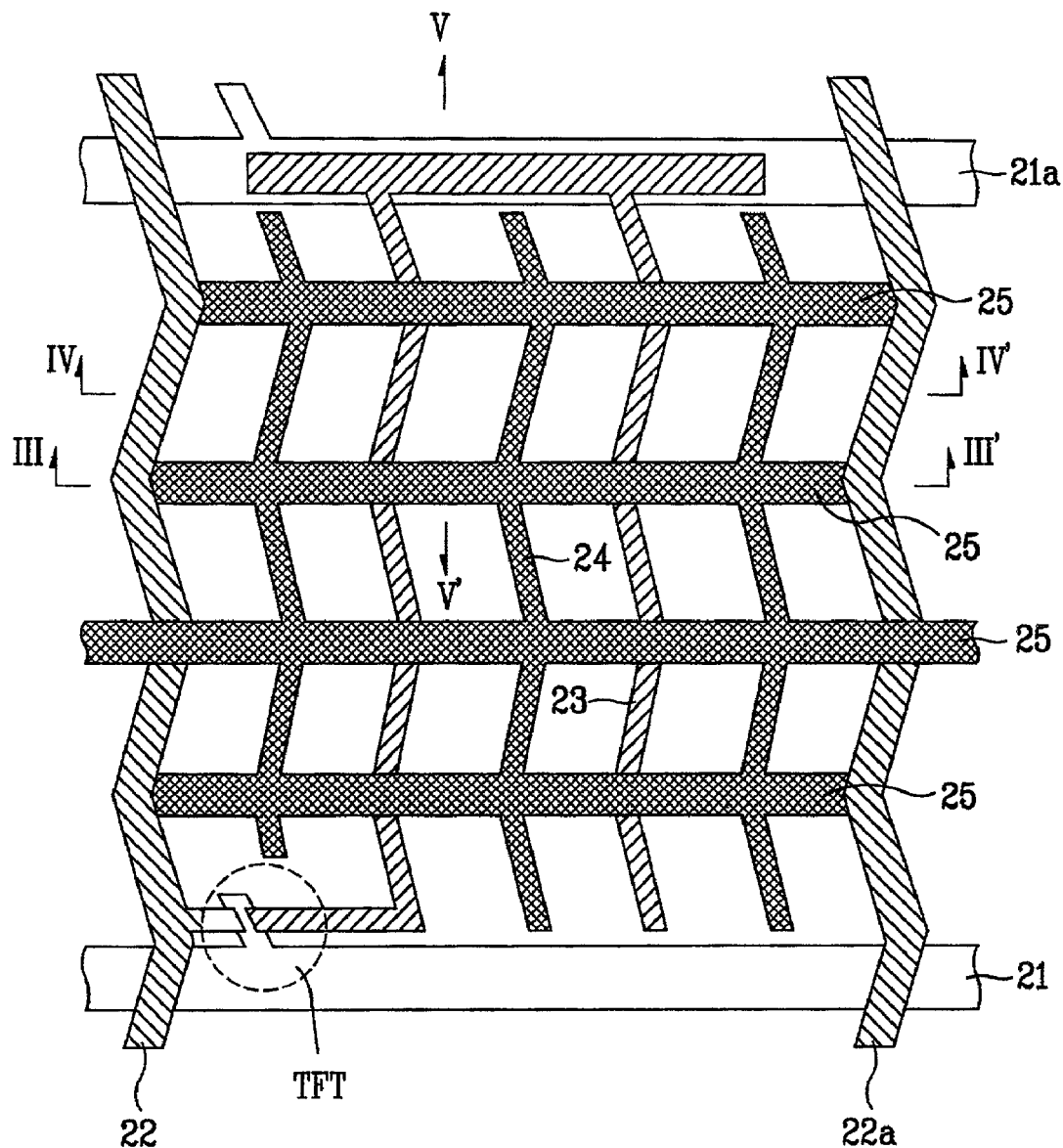
FIG. 6A is a plan view of a unit pixel showing an in-plane switching mode LCD device according to the third embodiment of the present invention.

As shown in FIG. 6A, an in-plane switching mode LCD device according to the present invention includes gate lines 21 and 21a formed on a substrate in one direction; data lines 22 and 22a formed in a zig-zag pattern having a plurality of bent portions to cross the gate lines 21 and 21a; a plurality of data electrodes 23 formed in a zig-zag pattern within a pixel region defined by the data and gate lines 22 and 22a and 21 and 21a, the data electrodes 23 having a plurality of bent portions substantially in parallel with the data lines 22 and 22a, adjacent data electrodes being connected with each other at respective bent portions; common electrodes 24 formed in a zig-zag pattern having a plurality of bent portions and formed at one side of the respective data electrodes; and a plurality of common lines 25 formed in parallel with the gate lines 21 and 21a to pass through the respective bent portions of the data lines 22 and 22a, the data electrodes 23, and the common electrodes 24.

Figure 6B:
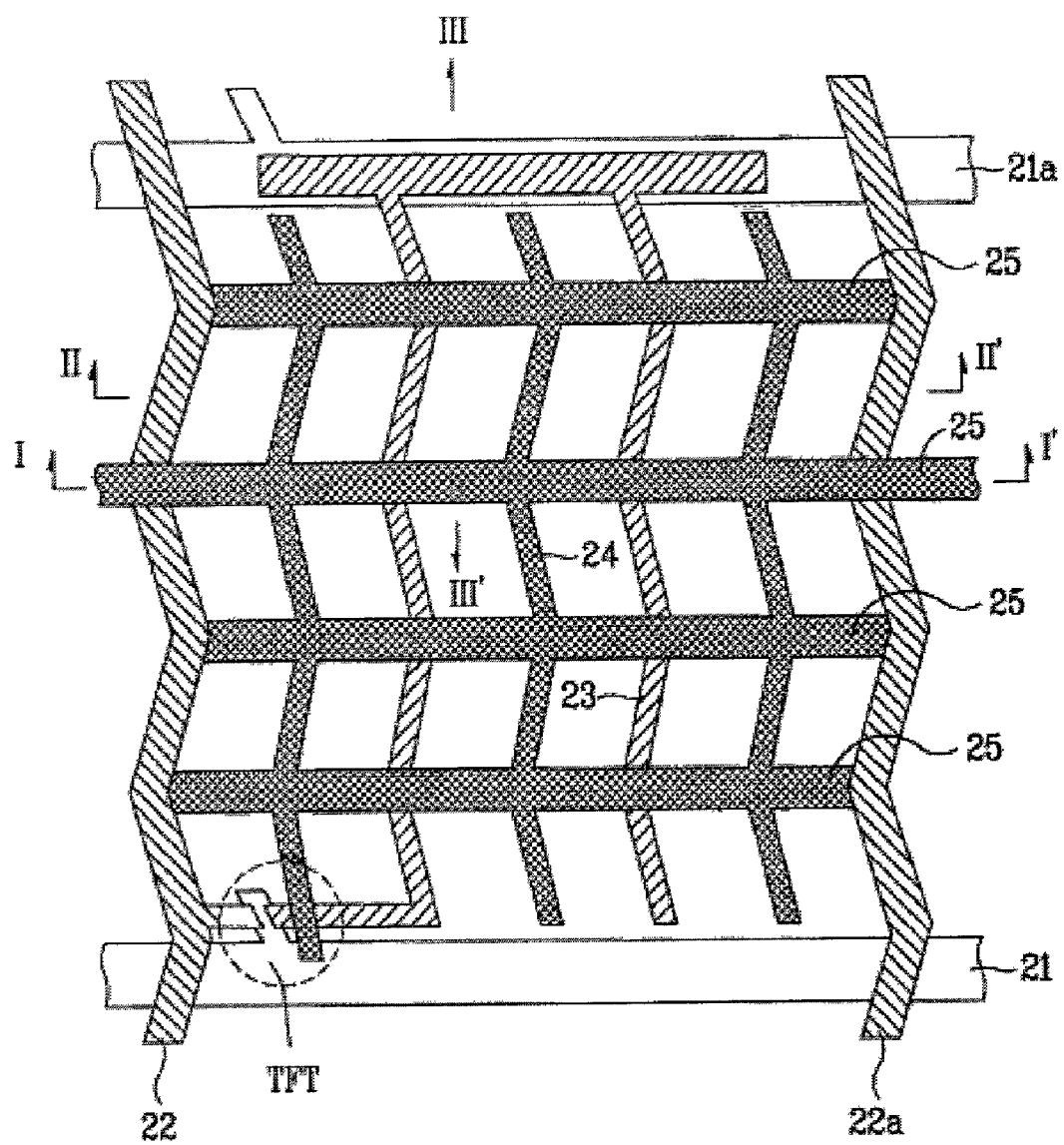
FIG. 6B is a plan view of a unit pixel showing an in-plane switching mode LCD device according to the forth embodiment of the present invention.

Unlike a structure of FIG. 6A, some of the plurality of data electrodes 23 may be formed to be connected with one another at an upper portion of neighboring gate lines 21a (see FIG. 6B).

The common electrodes 24, the common lines 25, and the data electrodes 23 are formed of a conductive material such as indium tin oxide (ITO) and indium zinc oxide (IZO).

Figure 7:
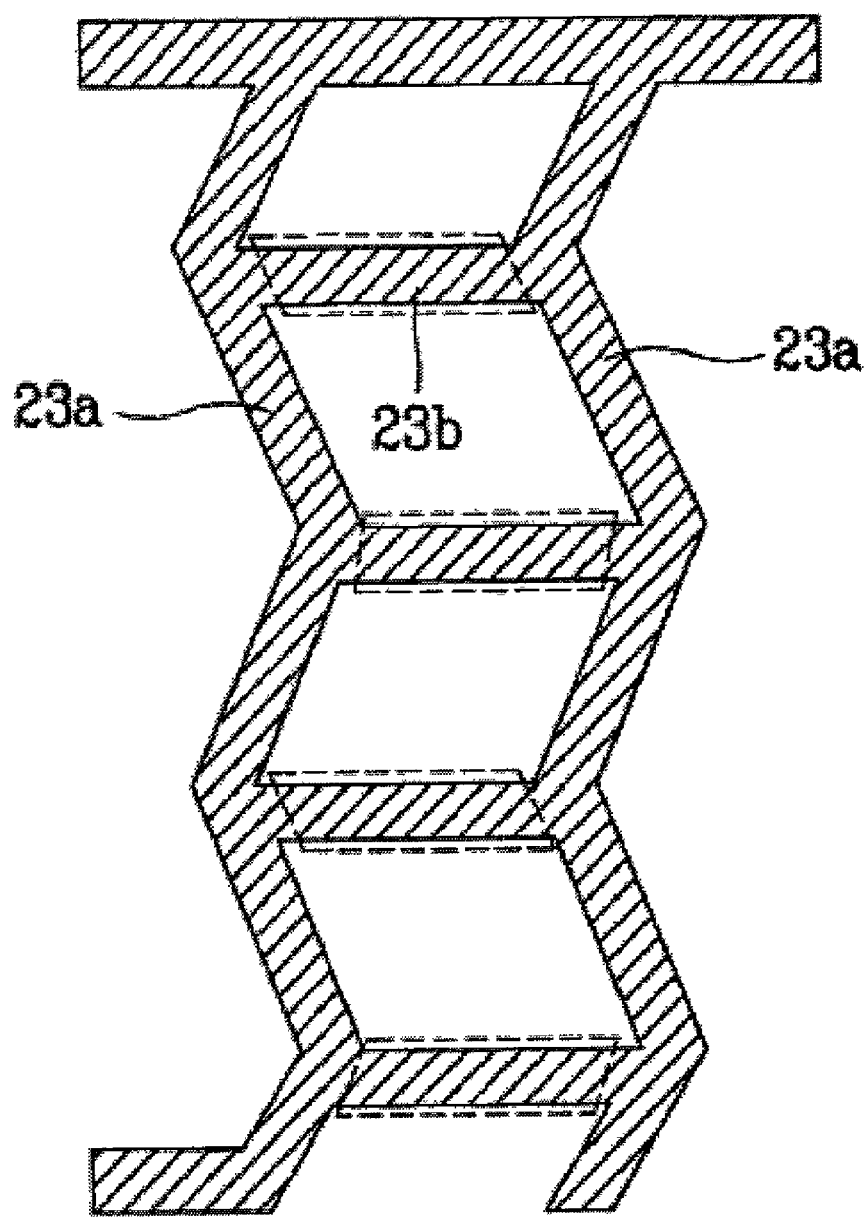
FIG. 7 is an enlarged view of a data electrode according to the third embodiment of the present invention.

As shown in FIG. 7, the data electrodes 23 include first electrodes 23a having a plurality of bent portions and formed in parallel with each other, and second electrodes 23b which connect bent portions of adjacent first electrodes 23a with each other. In other words, since the common lines 25 are connected with bent portions of adjacent data electrodes and are formed to pass through the bent portion, an overlap area between the common lines and the data electrodes is increased by a dotted line as compared with the first and second embodiments, thereby increasing a storage capacitor correspondingly. Moreover, since a plurality of the common lines 25 are formed, the storage capacitor is more increased when considering the data electrodes 23 overlapped at the lower portion of the common lines.

Figure 8A:
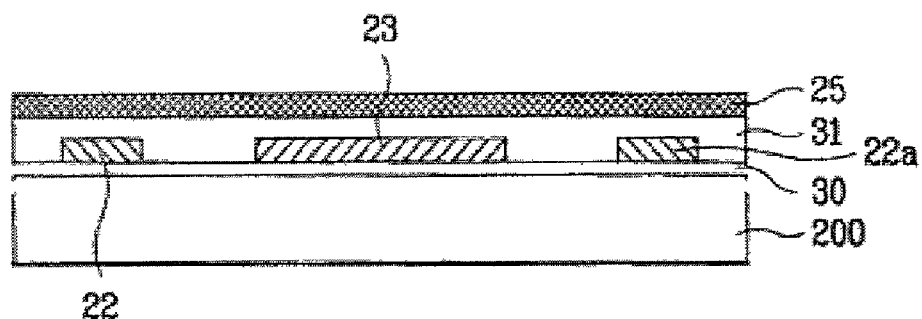
FIG. 8A is a sectional view taken along line III-III' of FIG. 6A.
Figure 8B:
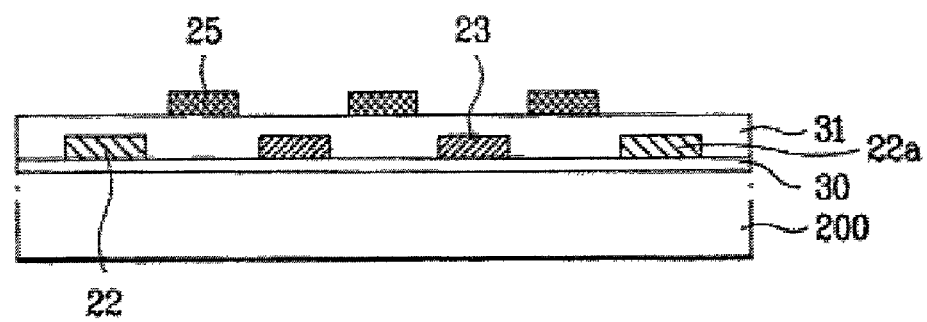
FIG. 8B is a sectional view taken along line IV-IV' of FIG. 6A.
Figure 8C:
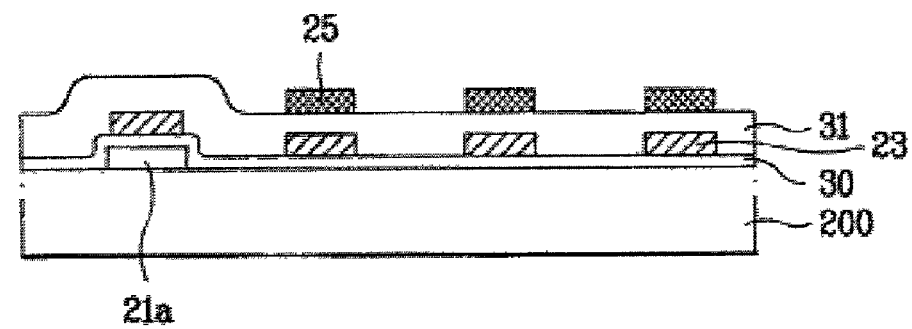
FIG. 8C is a sectional view taken along line V-V' of FIG. 6A.

Meanwhile, FIG. 8A is a sectional view taken along line III-III' of FIG. 6A. In FIG. 8A, it is noted that the overlap area between the data lines 22 and the data electrodes 23 is remarkably reduced. Moreover, as shown in FIG. 8C, since a plurality of the common lines 25 are formed, respective overlap areas between the common lines 25 and the data electrodes 23 are increased, thereby increasing the storage capacitor.

The data electrode 23 and the data lines 22 and 22a are formed on the gate insulating film 30, so they are insulated from the gate lines 21 and 21a. The passivation film 31 is formed on the entire surface including the data electrode 23. The common line 25 and the common electrode 24 are insulated from the data electrode 23 by the passivation film 31.

The TFT includes a source electrode extended from the data lines 22 and 22a, a drain electrode connected with the data electrode 23, and a gate electrode extended from the gate lines 21 and 21a. Also, the TFT is formed on a crossing point between the gate lines 21 and 21a and the data lines 22 and 22a.

For reference, since a method for manufacturing the in-plane switching mode LCD device according to the third embodiment of the present invention is similar to the method according to the first embodiment of the present invention, its description will be omitted. In the first embodiment of the present invention, one common line is formed within a unit pixel region. However, in the third embodiment of the present invention, the plurality of common lines are formed and at the same time neighboring data electrodes 23 are connected with each other so that an overlap area between the common line and the data electrode is maximized, thereby improving storage capacity.

As aforementioned, the in-plane switching mode LCD device has the following advantages.

First, since the data electrodes, the common lines, and the common electrodes are formed of a transparent electrode, it is possible to improve an aperture ratio.

Second, the common lines for prevention of disclination are used as a storage capacitor electrode without separately forming a storage capacitor electrode. This can simplify the process steps.

Third, since the gate lines are not flush with the common lines, it is possible to obtain a process margin.

Fourth, since a plurality of storage capacitors are formed within a unit pixel, it is possible to avoid a problem related to delay of a gate signal that may occur in a large area.

Finally, since the data lines are formed in a zig-zag pattern, a viewing angle can be improved and color characteristic can also be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a plurality of gate lines on a layer on a surface of a substrate;
   a plurality of data lines, crossing said gate lines, such that at least one pixel region is defined by the data and gate lines, at least one of said data lines defining the pixel region having a first data line section and a second data line section, the first data line section and the second data line section intersecting at a data line bent portion;
   at least one data electrode in the pixel region, the data electrode having a first data electrode section and a second data electrode section, the first data electrode section and the second data electrode section intersecting at a data electrode bent portion;
   at least one common electrode in the pixel region, the common electrode having a first common electrode section and a second common electrode section, the first common electrode section and the second common electrode section intersecting at a common electrode bent portion; and
   at least one common line in the pixel region, the common line crossing the data lines, the data electrode, and the common electrode, wherein the common line is formed on a different layer in a cross sectional view taken perpendicular to the surface of the substrate from the gate line.

2. The liquid crystal display device of claim 1, wherein the common line crosses the data line at the data line bent portion, the data electrode at the data electrode bent portion, and the common electrode at the common electrode bent portion.

3. The liquid crystal display device of claim 1, wherein the common line is substantially parallel to the gate line.

4. The liquid crystal display device of claim 1, wherein the first data line section, the first data electrode section, and the first common electrode section are substantially parallel.

5. The liquid crystal display device of claim 1, wherein the common lines comprise a transparent conductive material.

6. The liquid crystal display device of claim 1, wherein the data electrodes comprise a transparent conductive material.

7. The liquid crystal display device of claim 1, wherein the common electrodes comprise a transparent conductive material.

8. The liquid crystal display device of claim 1, wherein the data electrodes partially overlap at least one of the gate lines.

9. The liquid crystal display device of claim 1, wherein a storage capacitor is formed where the common line crosses the data electrode.

10. A liquid crystal display device comprising:
    a plurality of gate lines on a first surface of a substrate;
    a plurality of data lines, crossing said gate lines, such that at least one pixel region is defined by the data and gate lines, at least one of said data lines defining the pixel region, the data lines having a plurality of data line segments, the data line segments intersecting at data line bent portions, wherein each pixel region includes:
    at least one data electrode in the pixel region, each data electrode having a plurality of data electrode segments, the data electrode segments intersecting at data electrode bent portions; and
    at least one common electrode in the pixel region, each common electrode having a plurality of common electrode segments, the common electrode segments intersecting at common electrode bent portions; and
    at least one light shielding layer on the pixel region, the light shielding layer including light shielding lines that each cross the data lines, the data electrode, and the common electrode at respective ones of the data line bent portions, the data electrode bent portions and the common electrode bent portions, wherein the at least one light shielding layer is formed on a different layer in a cross sectional view taken perpendicular to the surface of the substrate from the gate lines.

11. The device of claim 10, wherein one of the at least one light shielding lines is a common line.

12. An in-plane switching mode liquid crystal display device comprising:
    gate lines formed on a substrate;
    data lines having a plurality of data line segments intersecting at a plurality of bent portions to cross the gate lines, crossings of the data and gate lines defining a pixel region, wherein each pixel region includes:
    a plurality of data electrodes and common electrodes each having a plurality of segments intersecting at bent portions, the data electrode segments each substantially parallel to a common electrode segment of the plurality of common electrode segments;
    a common line on bent portions of the data lines, the data electrodes and the common electrodes; and
    a plurality of auxiliary common lines on bent portions of the data electrodes and the common electrodes.

13. The device of claim 12, wherein the common lines are substantially parallel with the gate lines.

14. The device of claim 12, wherein the common lines include transparent conductive film.

15. The device of claim 12, wherein the data electrodes include transparent conductive film.

16. The device of claim 12, wherein the common electrodes include transparent conductive film.

17. The device of claim 12, wherein at least one of the common lines is formed within the pixel region.

18. The device of claim 12, wherein the data lines, the data electrodes, and the common electrodes have at least one bent portion.

19. The device of claim 12, wherein the common lines are formed integrally with the common electrodes and the common lines and common electrode are formed on the data electrode.

20. The device of claim 12, wherein the data electrodes are connected with the gate lines.

21. The device of claim 12, wherein the data electrodes overlap the gate lines.

22. The device of claim 12, wherein the data and common electrodes are on different layers.

23. The device of claim 12, further comprising a light shielding layer on the bent portion between the data electrodes and the common electrodes.

24. An in-plane switching mode liquid crystal display device, comprising:

gate lines on a substrate;

data lines having a plurality of data line segments intersecting at data line bent portions to cross the gate lines, the data and gate lines defining a pixel region wherein each pixel region includes:

a plurality of data electrodes each including a plurality of first data electrode segments intersecting at data electrode bent portions;

common electrodes having a plurality of common electrode segments each substantially parallel to a first date electrode segment of the plurality of first data electrode segments and intersecting at a plurality of common line bent portions, the common electrodes being connected with each other at the bent portions; and common lines on the bent portions of the data lines, the data electrodes and the common electrodes, wherein the data electrodes include a plurality of second data electrode segments that connect adjacent data electrodes at data electrode bent portions and that overlap the common lines.

25. The device of claim 24, wherein the data electrodes are overlapped with the gate lines.

26. The device of claim 24, wherein the common electrodes are connected together by the common lines.

27. The device of claim 24, wherein the data electrodes include a first electrode and a second electrode.

28. The device of claim 27, wherein the first electrode has a plurality of bent portions.

29. The device of claim 27, wherein the first electrode is connected with the second electrode.

30. The device of claim 24, further comprising a light shielding layer on the bent portion between the data electrodes and the common electrodes.

* * * * *